United States Patent
Uedaira

(10) Patent No.: US 10,281,611 B2
(45) Date of Patent: May 7, 2019

(54) PROXIMITY SENSOR AND ELECTRONIC APPARATUS INCLUDING THE SAME

(71) Applicant: Rohm Co., Ltd., Kyoto (JP)

(72) Inventor: Yoshitsugu Uedaira, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 27 days.

(21) Appl. No.: 15/183,272

(22) Filed: Jun. 15, 2016

(65) Prior Publication Data

US 2016/0377762 A1    Dec. 29, 2016

(30) Foreign Application Priority Data

Jun. 23, 2015  (JP) .................................. 2015-125651

(51) Int. Cl.
*G01V 8/12* (2006.01)

(52) U.S. Cl.
CPC ........................................ *G01V 8/12* (2013.01)

(58) Field of Classification Search
CPC .............. G01S 17/026; G01S 17/4813; G01S 17/4811; H01L 25/167
See application file for complete search history.

(56) References Cited

U.S. PATENT DOCUMENTS

| | | | |
|---|---|---|---|
| 2013/0048837 A1* | 2/2013 | Pope ..................... | G01J 1/0422 250/214.1 |
| 2015/0006106 A1* | 1/2015 | Ishikawa ................ | G01P 13/04 702/150 |
| 2015/0083900 A1 | 3/2015 | Caley et al. | |
| 2015/0212208 A1* | 7/2015 | Hanada ............... | H01L 31/0203 250/221 |
| 2015/0331211 A1* | 11/2015 | Kuo ..................... | G02B 6/4257 385/14 |
| 2015/0357483 A1* | 12/2015 | Lin ..................... | H01L 31/0203 250/239 |
| 2016/0013223 A1* | 1/2016 | Chang ................... | H01L 31/18 257/432 |

FOREIGN PATENT DOCUMENTS

| | | |
|---|---|---|
| JP | 2007-201360 | 8/2007 |
| JP | 2011-180121 | 9/2011 |
| JP | 2012-037276 | 2/2012 |

* cited by examiner

*Primary Examiner* — Thanh Luu
(74) *Attorney, Agent, or Firm* — Fish & Richardson P.C.

(57) ABSTRACT

A proximity sensor includes: a support substrate having a main surface and a rear surface; a surface emission laser; a light receiving part; and a resin body, wherein the surface emission laser is disposed on the main surface so as to emit light in a direction away from the rear surface; wherein the resin body is made of a light transmissive resin, and is disposed on the main surface so as to cover the surface emission laser and the light receiving part, and a portion of the resin body between the surface emission laser and the light receiving part is formed of the same light transmissive resin as the other portions, and wherein the light receiving part is disposed at a position at which the light emitted from the surface emission laser is reflected at an object and reflected light from the object is incident onto the light receiving part.

14 Claims, 12 Drawing Sheets

PROXIMITY SENSOR AND ELECTRONIC APPARATUS INCLUDING THE SAME

CROSS-REFERENCE TO RELATED APPLICATION(S)

This application is based upon and claims the benefit of priority from Japanese Patent Application No. 2015-125651, filed on Jun. 23, 2015, the entire contents of which are incorporated herein by reference.

TECHNICAL FIELD

The present disclosure relates to a proximity sensor which detects an object in a noncontact manner by means of a light emitting element and a light receiving element, and an electronic apparatus including the same.

BACKGROUND

A proximity sensor is used to detect the existence of an object and a distance to the object. The proximity sensor includes a light emitting element and a light receiving element. The object is irradiated with light from the light emitting element and reflected light from the object is received in the light receiving element. In general, a light emitting diode (LED) is used as the light emitting element of the proximity sensor. Many proximity sensors employ a package structure for reducing crosstalk caused by diffused light of the light emitting diode.

In a photo-reflector device, a light emitting element and a light receiving element individually sealed by a light transmissive resin are further sealed by a light shielding resin to be optically isolated from each other, thereby reducing crosstalk.

In a proximity sensor, optical isolation between a light emitter and a photodetector is made by an opaque metal housing. Diffused light is condensed by a lens arrangement formed above the light emitter, thereby reducing crosstalk.

In another proximity sensor, a VCSEL (Vertical Cavity Surface Emitting Laser) is used as a light emitting element. In this proximity sensor, the VCSEL and a light receiving element are disposed on a substrate.

FIGS. 17A and 17B are a sectional view and a plane view, respectively, showing one example of a conventional optical measuring device including a light emitting element and a light receiving element. In the optical measuring device 100 shown in FIGS. 17A and 17B, the light emitting element 101 and the light receiving element 102 individually sealed by a light transmissive resin are further sealed by a light shielding resin 103 to be optically isolated from each other. In addition, two lenses 104 are optically isolated from each other by a light shielding wall 106. Therefore, light emitted from the light emitting element 101 is reflected by the lenses 104 or an inner wall of a case 105, thereby preventing the light from being directly incident onto the light receiving element 102. In addition, an inter-lens distance control part 107 is disposed inside the case 105. Further, a temperature sensor 108 is disposed inside the light receiving element 102.

However, the above-described photo-reflector device is complicated in structure and is increased in size since the light shielding resin is formed between the light emitting element and the light receiving element so as to create an optical isolation between the light emitting element and the light receiving element.

The above-described proximity sensor is complicated in structure and is increased in size since the opaque metal housing is formed between the light emitter and the photodetector so as to make the optical isolation between the light emitter and the photodetector and the lens arrangement is formed.

The above-described proximity sensor does not have a specified structure to protect the VCSEL and the light receiving element by means of a light transmissive resin.

The above-described optical measuring device 100 shown in FIGS. 17A and 17B is complicated in structure and is increased in size since the light shielding resin 103 is formed between the light emitting element 101 and the light receiving element 102 so as to make the optical isolation between the light emitting element 101 and the light receiving element 102, two lenses 104 are disposed, and the light shielding wall 106 is formed between the two lenses 104.

SUMMARY

The present disclosure provides some embodiments of a proximity sensor with a simple structure, which is capable of reducing crosstalk and being decreased in size.

According to one embodiment of the present disclosure, there is provided a proximity sensor including: a support substrate; a surface emission laser; a light receiving part; and a resin body. The support substrate has a main surface on which the surface emission laser and the light receiving part are disposed, and a rear surface. The surface emission laser is disposed on the main surface so as to emit light in a direction away from the rear surface of the support substrate. The resin body is made of a light transmissive resin through which the light emitted from the surface emission laser transmits, and is disposed on the main surface of the support substrate so as to integrally cover the surface emission laser and the light receiving part, and a portion of the resin body between the surface emission laser and the light receiving part is formed of the same light transmissive resin as the other portions. The light receiving part is disposed at a position at which the light emitted from the surface emission laser is reflected at an object and reflected light from the object is incident onto the light receiving part.

The surface emission laser has higher straightness of light than a light emitting diode, i.e., light emitted from the surface emission laser is hardly diffused. This makes it possible to reduce crosstalk. In addition, with no need to form a resin or metal light shielding wall between the surface emission laser and the light receiving part, the surface emission laser and the light receiving part may be integrally covered with the same light transmissive resin. Therefore, it is possible to simplify the structure of the proximity sensor and hence reduce costs for the proximity sensor. In addition, since it is unnecessary to form a light shielding wall between the surface emission laser and the light receiving part, it is possible to make the surface emission laser and the light receiving part closer to each other. As a result, it is possible to make the proximity sensor more compact.

The light emitted from the surface emission laser may have a certain spread angle and include center light of a first direction and inclined light of a second direction which is inclined from the first direction to the light receiving part. An outer surface of the resin body may include an inclined surface which is formed so as to refract the second direction inclined light of the light emitted from the surface emission laser to a direction closer to the first direction than the second direction. The light receiving part may be disposed at a position at which the second direction inclined light refracted by the inclined surface is reflected at the object and reflected light from the object is incident onto the light receiving part.

By providing the inclined surface in the outer surface of the resin body, it is possible to control the inclined light emitted from the surface emission laser to travel in an appropriate direction. Thus, it is possible to easily reduce crosstalk. In addition, by providing the inclined surface, the surface emission laser and the light receiving part can be further closer to each other. As a result, it is possible to achieve compactness and low costs of the proximity sensor.

A notched portion may be formed on the outer surface of the resin body and the notched portion may have an inclined surface.

The notched portion may have an inverted triangular sectional shape, an inverted trapezoidal sectional shape or an arc sectional shape.

A convex portion may be formed on the outer surface of the resin body and the convex portion may have an inclined surface.

The convex portion may have a triangular sectional shape, a trapezoidal sectional shape or an arc sectional shape.

A stepped portion may be formed on the outer surface of the resin body and the stepped portion may have an inclined surface.

The surface emission laser may be a vertical cavity surface emitting laser.

The surface emission laser may be a vertical external cavity surface emitting laser.

According to another embodiment of the present disclosure, there is provided an electronic apparatus including the above-described proximity sensor.

Since the proximity sensor is used for the electronic apparatus, the electronic apparatus can be made more compact and can be easily manufactured.

The electronic apparatus may be a cellular phone or a digital camera.

The electronic apparatus may include a housing in which the proximity sensor is accommodated. The housing may include a window part and the proximity sensor may be disposed such that light emitted from the surface emission laser arrives at the object through the window part and reflected light from the object is incident onto the light receiving part through the window part.

With this configuration, the surface emission laser can emit the light to the object through the window part and the reflected light from the object can be received in the light receiving part through the same window part. Therefore, it is possible to achieve compactness and low costs for the window part.

DETAILED DESCRIPTION

A proximity sensor and an electronic apparatus including the same according to some embodiments of the present disclosure will now be described in detail with reference to the drawings.

First Embodiment

Figure 1A:
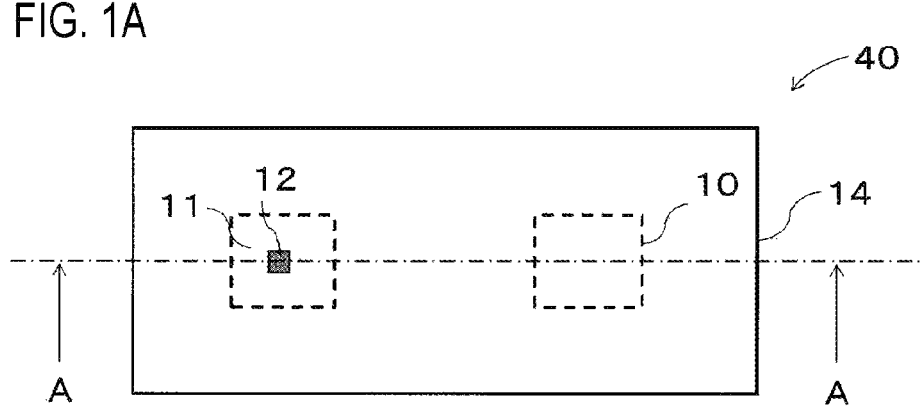
FIG. 1A is a schematic plan view of a proximity sensor according to a first embodiment of the present disclosure.
Figure 1B:
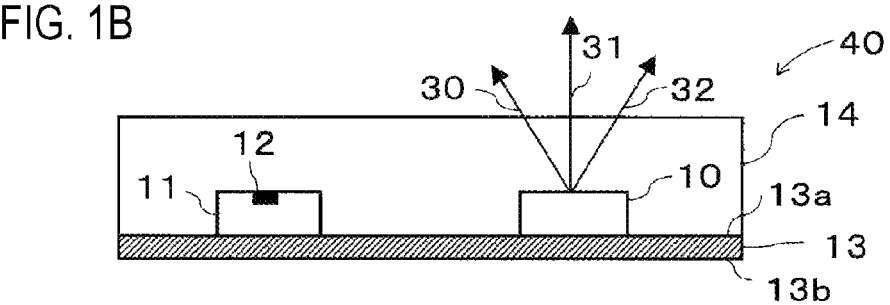
FIG. 1B is a schematic sectional view taken along line A-A in FIG. 1A.

FIG. 1A is a schematic plan view illustrating the configuration of a proximity sensor 40 according to a first embodiment of the present disclosure. FIG. 1B is a schematic sectional view taken along line A-A in FIG. 1A.

A proximity sensor 40 according to the first embodiment includes a VCSEL (Vertical Cavity Surface Emitting Laser) 10 as a light emitting part, a light receiving part 11, a support substrate 13 and a resin body 14. The support substrate 13 has a main surface 13a and a rear surface 13b. The VCSEL 10 and the light receiving part 11 are formed on the main surface 13a of the support substrate 13 and are integrally sealed by the same resin body 14.

The VCSEL 10 emits light substantially perpendicularly to a substrate surface of the VCSEL 10 since the resonance direction of light is perpendicular to the substrate surface of the VCSEL 10. In the first embodiment, the VCSEL 10 is formed on the main surface 13a of the support substrate 13 in a manner to emit light in a way that is away from the rear surface 13b of the support substrate 13 and is substantially perpendicular to the support substrate 13. The emitted light from the VCSEL 10 has a certain spread angle and includes center light 31 perpendicular to the support substrate 13, inclined light 30 which is inclined from the center light 31 toward the light receiving part 11, and inclined light 32 which is inclined from the center light 31 so as to be away from the light receiving part 11. The light output from the VCSEL 10 is spread with a range of inclination of 5 to 20 degrees with respect to a direction perpendicular to the substrate surface of the VCSEL 10. A wavelength of the light emitted from the VCSEL 10 falls within a range of 650 nm to 1300 nm, for example.

The light receiving part 11 includes a light receiving element 12 and a signal processing circuit (not shown). An example of the light receiving element 12 may include a photodiode. The signal processing circuit may include an A/D (Analog/Digital) converter and so on. The light receiving element 12 is formed so as to be exposed on the upper surface of the light receiving part 11. The light receiving part 11 is disposed on the main surface 13a of the support substrate 13 such that the upper surface of the light receiving part 11 is in parallel to the main surface 13a of the support substrate 13. When light is incident onto the light receiving element 12, an analog signal based on the intensity of the light is output from the light receiving element 12. The light receiving element 12 has high light reception sensitivity to the wavelength of the light emitted from the VCSEL 10.

The support substrate 13 is a rigid substrate or a flexible substrate. An example of the rigid substrate may include hard resin such as glass epoxy, or ceramics. An example of the flexible substrate may include a soft material such as polyimide. In the first embodiment, the support substrate 13 has a rectangular shape.

The VCSEL 10 and the light receiving part 11 are disposed at an interval on the main surface 13a of the support substrate 13. In the first embodiment, a line connecting the VCSEL 10 and the light receiving part 11 is substantially parallel to the long side of the support substrate 13.

The resin body 14 is provided to protect the VCSEL 10 and the light receiving part 11 from water, atmosphere, contamination, shock and so on. In the resin body 14, a portion between the VCSEL 10 and the light receiving part 11 is formed of the same resin as other portions. The resin body 14 is made of a light transmissive resin through which the light emitted from the VCSEL 10 transmits. An example of the light transmissive resin may include a transparent or semi-transparent resin such as an epoxy resin, silicone resin, silicone-modified epoxy resin, polyamide resin, acryl resin, urea resin or the like. An example of the epoxy resin may include a bisphenol A type, bisphenol F type or bisphenol S type.

The VCSEL 10 may be replaced with VECSEL (Vertical External Cavity Surface Emitting Laser). In this case, in the resin body, an external reflector is formed at a position through which light from the VECSEL passes.

Figure 2A:
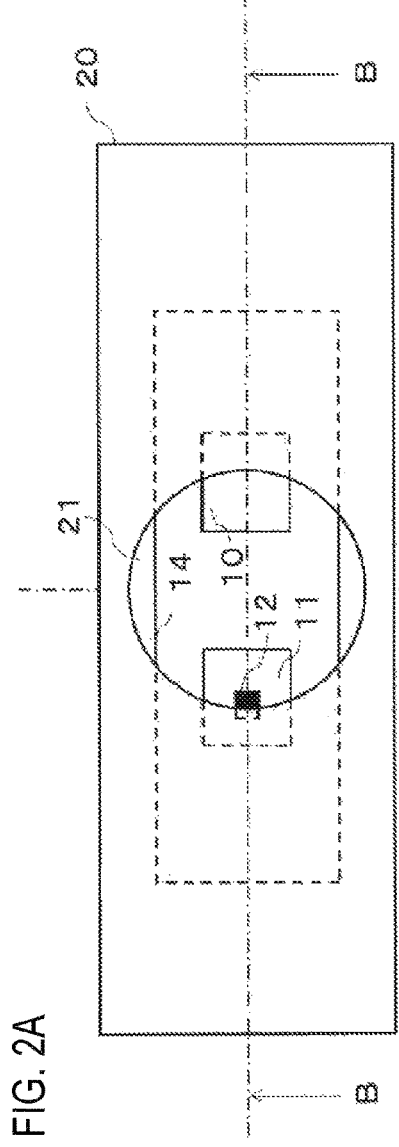
FIG. 2A is a schematic plan view of a portion of an electronic apparatus including the proximity sensor according to the first embodiment of the present disclosure.
Figure 2B:
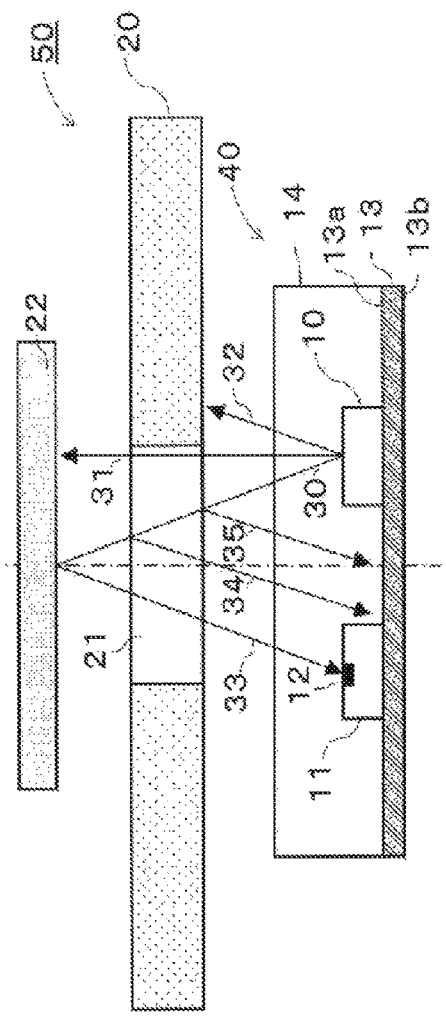
FIG. 2B is a schematic sectional view taken along line B-B in FIG. 2A.

FIG. 2A is a schematic plan view of a portion of an electronic apparatus 50 including the proximity sensor 40 shown in FIGS. 1A and 1B. FIG. 2B is a schematic sectional view taken along line B-B in FIG. 2A.

The electronic apparatus 50 includes a housing 20 and the proximity sensor 40 shown in FIGS. 1A and 1B. A window part 21 is formed in the housing 20. The VCSEL 10 emits light toward the housing 20. The electronic apparatus 50 is, for example, a cellular phone or digital camera.

An input part such as a touch panel (not shown) is provided in the housing 20. A portion of operation of the touch panel is controlled by an output signal from the light receiving element 12 of the proximity sensor 40.

In the first embodiment, the window part 21 has a circular planar shape. The window part 21 is made of light transmissive resin through which the light emitted from the VCSEL 10 transmits. An example of the light transmissive resin may include a transparent or semi-transparent resin such as glass, epoxy resin, polycarbonate resin, acryl resin or the like.

In the proximity sensor 40, the VCSEL 10 and the light receiving part 11 are placed within the housing 20 so that a portion of the VCSEL 10 and a portion of the light receiving part 11 face the window part 21. The inclined light 30 emitted from the VCSEL 10 is reflected at interfaces between the window part 21 and air and reflected light 34 and reflected light 35 are incident into the proximity sensor 40. A distance between the housing 20 and the proximity sensor 40 is set so as to prevent the reflected light 34 and the reflected light 35 from being incident onto the light receiving element 12.

The VCSEL 10 is driven to emit light at certain time intervals. The center light 31 emitted from the VCSEL 10 is emitted to the outside of the housing 20 through the window part 21. The inclined light 32 is reflected at the inner surface of the housing 20 in a direction away from the light receiving part 11. The inclined light 30 is emitted to the outside of the housing 20 through the window part 21 of the housing 20. If an object 22 is present in the vicinity of the window part 21 in the outside of the housing 20, the inclined light 30 is reflected at the object 22. Reflected light 33 from the object 22 is incident onto the light receiving element 12 of the light receiving part 11 through the window part 21 of the housing 20. The light receiving element 12 outputs an analog signal based on the intensity of the incident light. The analog signal output from the light receiving element 12 is converted into a digital value by an A/D converter. The object 22 is detected based on the digital value.

When the object 22 is moved away from the window part 21, the inclined light 30 emitted from the VCSEL 10 travels straight to the outside of the housing 20 through the window part 21 of the housing 20. Thereby, the incidence of the reflected light 33 onto the light receiving element 12 disappears and the detection state of the object 22 is released.

If sunlight or light from a fluorescent lamp or the like is incident onto the light receiving element 12, a noise occurs in the output signal of the light receiving element 12. The noise is removed by subtracting an output signal of the light receiving element 12 when the VCSEL 10 emits light from an output signal of the light receiving element 12 when the VCSEL 10 emits no light.

The VCSEL 10 has higher straightness of light than a light emitting diode, i.e., light emitted from the VCSEL 10 is hardly diffused. This makes it possible to reduce crosstalk. In addition, with no need to form a resin or metal light shielding wall between the VCSEL 10 and the light receiving part 11, the VCSEL 10 and the light receiving part 11 may be integrally covered with the same light transmissive resin. Therefore, it is possible to simplify the structure of the proximity sensor 40 and hence reduce costs for the proximity sensor 40. In addition, since it is unnecessary to form a light shielding wall between the VCSEL 10 and the light receiving part 11, it is possible to make the VCSEL 10 and the light receiving part 11 closer to each other. As a result, it is possible to make the proximity sensor 40 more compact. Further, the reflected lights 34 and 35 from the interfaces between the window part 21 and air are not incident onto the light receiving element 12. In other words, no crosstalk occurs.

An electronic apparatus using a conventional proximity sensor includes a window part through which light emitted from a light emitting element passes, and a separate window part through which reflected light from an object passes. In contrast, in the first embodiment, the inclined light 30 emitted from the VCSEL 10 and the reflected light 33 from the object 22 can share one window part 21. In the conventional electronic apparatus, a distance from the end of one of the two window parts to the end of the other is typically 2 to 3 mm. In contrast, according to the first embodiment, the diameter of the window part 21 of the electronic apparatus 50 can be suppressed to 1 to 2 mm. As a result, it is possible to achieve compactness and low costs of the window part 21.

In general, in manufacturing an electronic apparatus, a distance between a proximity sensor and a window part has a variation. In a conventional proximity sensor, since light from a light emitting element is diffused, it is necessary to strictly adjust a distance between the proximity and a window part so as to prevent reflected light from interfaces between the window part and air from being incident onto a light receiving element. In contrast, with the proximity sensor 40 according to the first embodiment, since light having high straightness is emitted from the VCSEL 10, even when the distance between the proximity sensor 40 and the window sensor 21 has a variation, the reflected light 34 and the reflected light 35 from the interfaces between the window part 21 and air are incident between the VCSEL 10 and the light receiving element 12. Therefore, in manufacturing the electronic apparatus 50 according to the first embodiment, it is possible to reduce a burden of variation adjustment of the distance between the proximity sensor 40 and the window 21.

If the electronic apparatus 50 is a cellular phone or digital camera, the object 22 is, for example, a user's face. A range of detection of the object 22 by the proximity sensor 40 is, for example, within 5 cm from the window part 21.

For the cellular phone, when the object 22 is detected during a call, display of a screen of a touch panel of the cellular phone is turned off and a function of the touch panel is also turned off. When the object 22 is moved away from the window part 21, the object 22 is not detected by the proximity sensor 40. In this case, the display of the screen of the touch panel is turned on and the function of the touch panel is also turned on.

In this way, when the cellular phone is used, it is possible to prevent the cellular phone from malfunctioning, such as call disconnection, due to contact of a portion of a user's face with the touch panel at the time of making a call. In addition, since the display of the touch panel is turned off during a call, power consumption is reduced, which is economical.

For the digital camera, when the object 22 is detected at the time of photographing a subject, display of a screen of a touch panel of the digital camera is turned off and a function of the touch panel is also turned off. When the object 22 is moved away from the window part 21, the object 22 is not detected by the proximity sensor 40. In this case, the display of the screen of the touch panel is turned on and the function of the touch panel is also turned on.

In this way, when the digital camera is used, it is possible to prevent the digital camera from malfunctioning due to contact of a portion of a user's face with the touch panel at the time of photographing a subject. In addition, since the display of the touch panel is turned off during photographing of the subject, power consumption is reduced, which is economical.

Figure 3:
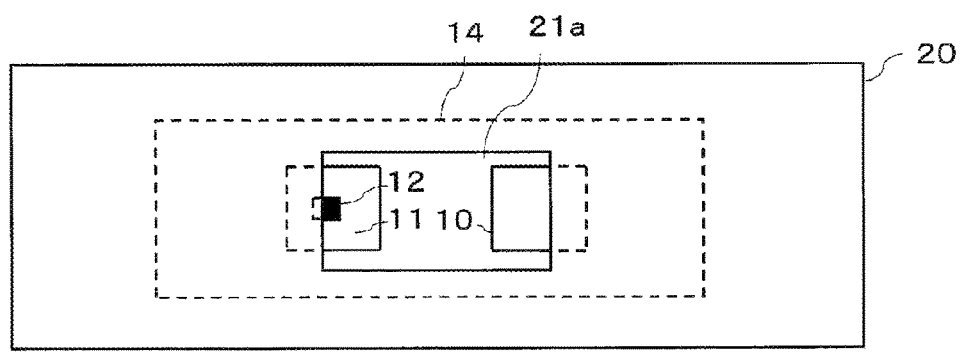
FIG. 3 is a schematic plan view showing an example of a window part of the proximity sensor according to the first embodiment of the present disclosure.

FIG. 3 is a schematic plane view showing another example of the window part 21 of the electronic apparatus 50 including the proximity sensor 40 of FIG. 1. In the example of FIG. 3, a window part 21a has a rectangular shape. In this case, it is possible to make the area of the window part 21a smaller than that of the circular planar window part 21. FIG. 3 also shows the VCSEL 10, the light receiving part 11, the light receiving element 12, the resin body 14 and the housing 20 as shown in FIG. 2.

Figure 4:
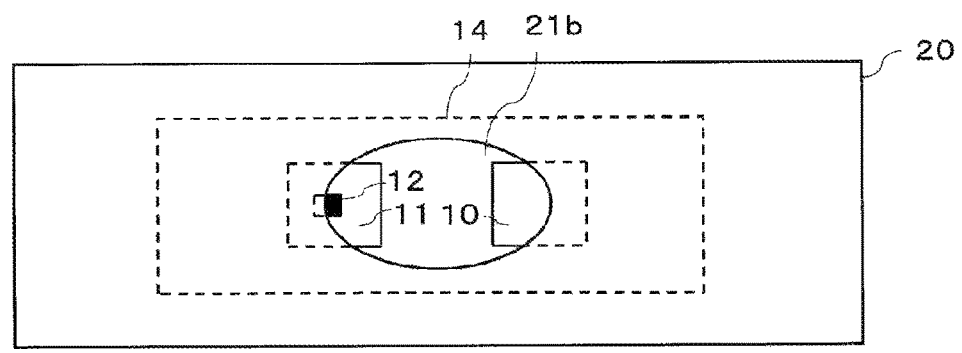
FIG. 4 is a schematic plan view showing another example of the window part of the proximity sensor according to the first embodiment of the present disclosure.

FIG. 4 is a schematic plane view showing another example of the window part 21 of the electronic apparatus 50 including the proximity sensor 40 of FIG. 1. In the example of FIG. 4, a window part 21b has an elliptical shape. In this case, it is possible to make the area of the window part 21b smaller than that of the circular planar window part 21. FIG. 4 also shows the VCSEL 10, the light receiving part 11, the light receiving element 12, the resin body 14 and the housing 20 as shown in FIG. 2.

The shape of the window part 21 is not limited to the above-mentioned examples. The window part 21 may have any other shapes such as a polygonal shape, a semi-circular shape and the like as long as light emitted from the VCSEL 10 and reflected light from the object 22 can pass through them.

In this case, the window part 21 can be designed in different ways.

Second Embodiment

Figure 5A:
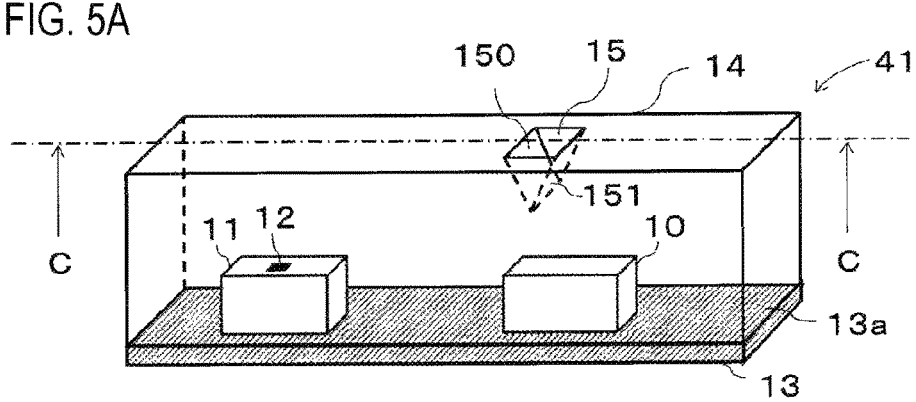
FIG. 5A is a schematic perspective view illustrating the configuration of a proximity sensor according to a second embodiment of the present disclosure.
Figure 5B:
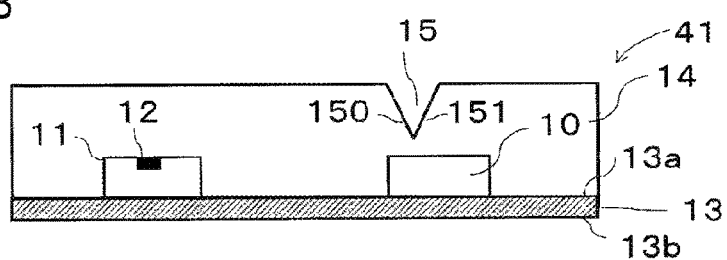
FIG. 5B is a schematic sectional view taken along line C-C in FIG. 5A.

FIG. 5A is a schematic perspective view illustrating the configuration of a proximity sensor according to a second embodiment of the present disclosure. FIG. 5B is a schematic sectional view taken along line C-C in FIG. 5A. A proximity sensor according to the second embodiment is different in the following aspects from the proximity sensor of the first embodiment of the present disclosure.

As illustrated in FIGS. 5A and 5B, a notched portion 15 is formed at a position through which the inclined light 30 emitted from the VCSEL 10 passes, on an outer surface of the resin body 14. In the example of FIGS. 5A and 5B, the notched portion 15 has an inverted triangular sectional shape. The notched portion 15 has a pair of inclined surfaces 150 and 151 inclined with respect to the main surface 13a of the support substrate 13. The inclined surfaces 150 and 151 are formed to extend in a direction substantially perpendicular to the direction in which the VCSEL 10 and the light receiving part 11 are aligned. Of the inclined surfaces 150 and 151, the inclined surface 151 is formed such that the inclined light 30 emitted from the VCSEL 10 is incident onto the inclined surface 151 and is refracted to a direction closer to the direction of the center light 31 than the incident direction of the inclined light 30. The resin body 14 and the notched portion 15 are simultaneously molded by a mold. Alternatively, the notched portion 15 may be shaped by cutting or etching.

Figure 6:
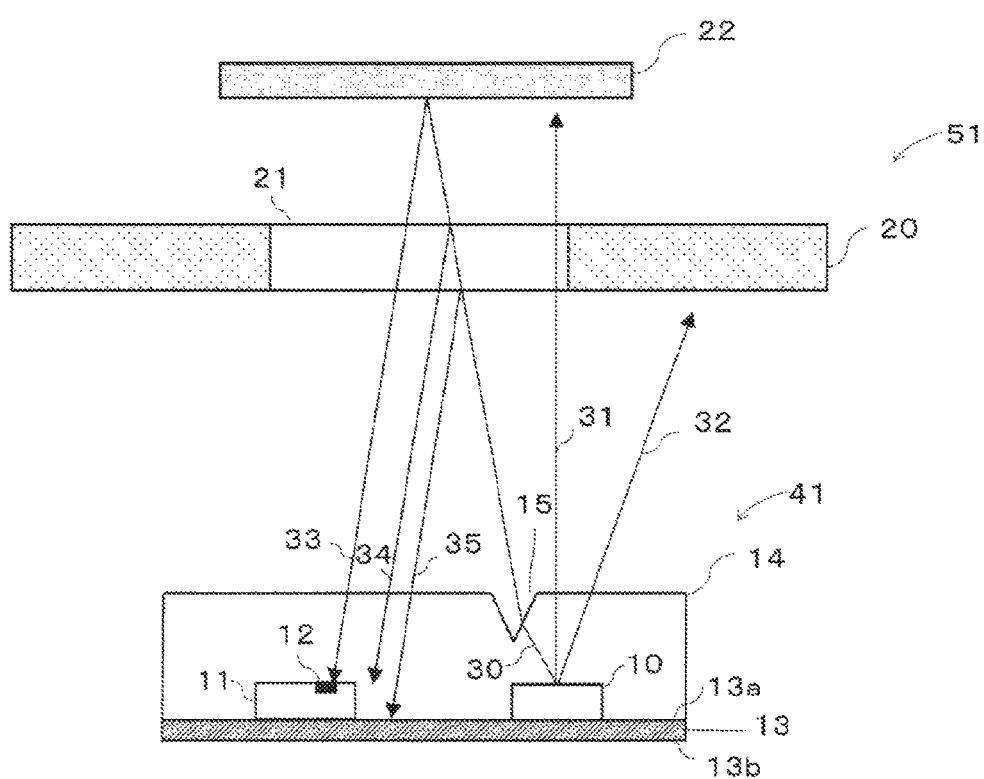
FIG. 6 is a schematic sectional view illustrating a portion of an electronic apparatus including the proximity sensor according to the second embodiment of the present disclosure.

FIG. 6 is a schematic sectional view illustrating a portion of an electronic apparatus 51 including a proximity sensor 41 according to the second embodiment of the present disclosure.

The electronic apparatus 51 includes a housing 20 and a proximity sensor 41. A window part 21 is formed in the housing 20. The electronic apparatus 51 is a cellular phone or digital camera.

The VCSEL 10 is driven to emit light at certain time intervals. Center light 31 emitted from the VCSEL 10 is emitted to the outside of the housing 20 through the window part 21. Inclined light 32 is reflected at the inner surface of the housing 20 in a direction away from the light receiving part 11. The inclined light 30 is refracted at the inclined surface 151 of the notched portion 15 and is emitted to the outside of the housing 20 through the window part 21 of the housing 20. If an object 22 is present in the vicinity of the window part 21 in the outside of the housing 20, the inclined light 30 is reflected at the object 22. Reflected light 33 from the object 22 is incident onto the light receiving element 12 of the light receiving part 11 through the window part 21 of the housing 20. The light receiving element 12 outputs an analog signal based on the intensity of the incident light. The analog signal output from the light receiving element 12 is converted into a digital value by an A/D converter. The object 22 is detected based on the digital value.

When the object 22 is moved away from the window part 21, the inclined light 30 emitted from the VCSEL 10 is refracted at the inclined surface 151 of the notched portion 15 and travels straight to the outside of the housing 20 through the window part 21 of the housing 20. Thereby, the incidence of the reflected light 33 onto the light receiving element 12 disappears and the detection state of the object 22 is released.

In the proximity sensor 41 according to the second embodiment, the inclined surface 151 of the notched portion 15 can be used to control the inclined light 30 emitted from the VCSEL 10 to travel in an appropriate direction. Thus, it is possible to easily reduce crosstalk. In addition, by forming the notched portion 15, the VCSEL 10 and the light receiving part 11 can be closer to each other. As a result, it is possible to achieve compactness and low costs of the proximity sensor 41 and the window part 21. Further, since the resin body 14 and the notched portion 15 may be simultaneously and integrally molded by a mold, the increase in the number of processes of manufacture can be suppressed.

Figure 7:
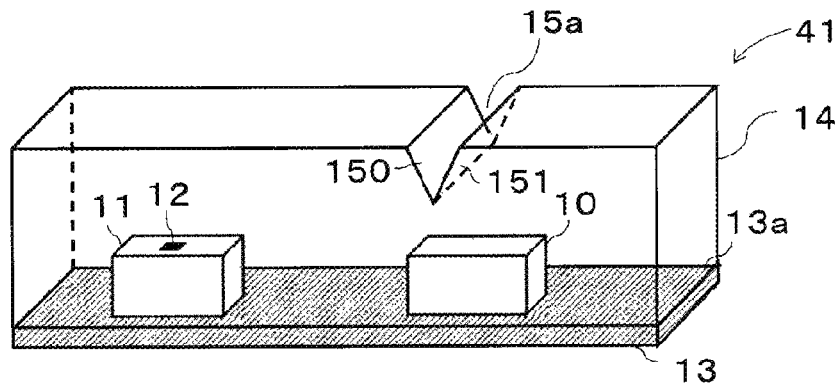
FIG. 7 is a schematic perspective view showing an example of a notched portion of the proximity sensor according to the second embodiment of the present disclosure.

FIG. 7 is a schematic perspective view showing another example of the notched portion 15 of the proximity sensor 41 of FIG. 5. In the example of FIG. 7, a notched portion 15a is formed to extend from one side of the resin body 14 to the other opposing side in a direction substantially perpendicular to the direction in which the VCSEL 10 and the light receiving part 11 are aligned. The notched portion 15a has an inverted triangular sectional shape. The notched portion 15a has a pair of inclined surfaces 150 and 151.

Figure 8:
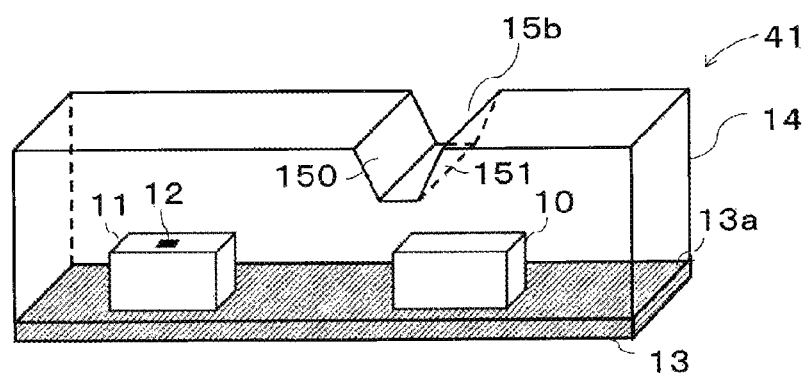
FIG. 8 is a schematic perspective view showing another example of the notched portion of the proximity sensor according to the second embodiment of the present disclosure.

FIG. 8 is a schematic perspective view showing another example of the notched portion 15 of the proximity sensor 41 of FIG. 5. In the example of FIG. 8, a notched portion 15b is formed to extend from one side of the resin body 14 to the other opposing side in a direction substantially perpendicular to the direction in which the VCSEL 10 and the light receiving part 11 are aligned. The notched portion 15b has an inverted trapezoidal sectional shape. The notched portion 15b has a pair of inclined surfaces 150 and 151.

Figure 9:
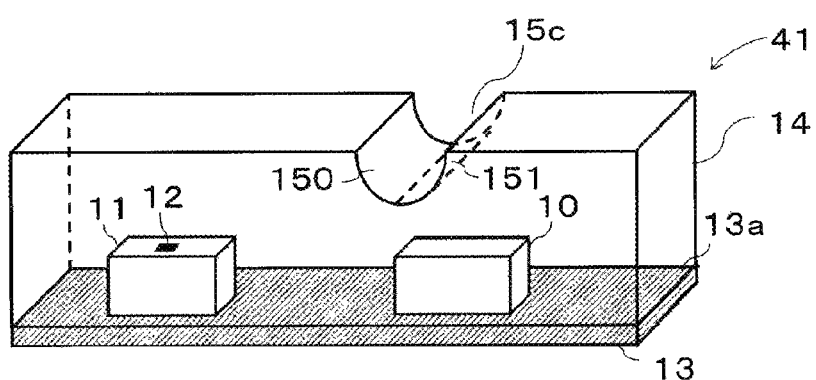
FIG. 9 is a schematic perspective view showing another example of the notched portion of the proximity sensor according to the second embodiment of the present disclosure.

FIG. 9 is a schematic perspective view showing another example of the notched portion 15 of the proximity sensor 41 of FIG. 5. In the example of FIG. 9, a notched portion 15c is formed to extend from one side of the resin body 14 to the other opposing side in a direction substantially perpendicular to the direction in which the VCSEL 10 and the light receiving part 11 are aligned. The notched portion 15c has a semi-circular sectional shape. The notched portion 15c has a pair of inclined surfaces 150 and 151.

Each of the notched portions 15a, 15b and 15c respectively shown in FIGS. 7, 8 and 9 can be relatively easily shaped by a mold, cutting or etching.

The planar and sectional shape of the notched portion 15a, 15b or 15c is not limited to the above-described examples. The notched portion 15a, 15b or 15c may have any other shapes such as a polygonal shape, a semi-elliptical shape and the like as long as the inclined light 30 emitted from the VCSEL 10 can be refracted to a direction closer to the direction of the center light 31 than the incident direction of the inclined light 30. In addition, the notched portion 15a, 15b or 15c may not be necessarily formed to extend from one side of the resin body 14 to the other opposing side in a direction substantially perpendicular to the direction in which the VCSEL 10 and the light receiving part 11 are aligned. For example, if the inclined light 30 emitted from the VCSEL 10 can be refracted to a direction closer to the direction of the center light 31 than the incident direction of the inclined light 30, the notched portion 15a, 15b or 15c may be formed to extend in a direction substantially perpendicular to the direction in which the VCSEL 10 and the light receiving part 11 are aligned, with a certain distance from both sides of the resin body 14 to the inside thereof.

Third Embodiment

Figure 10A:
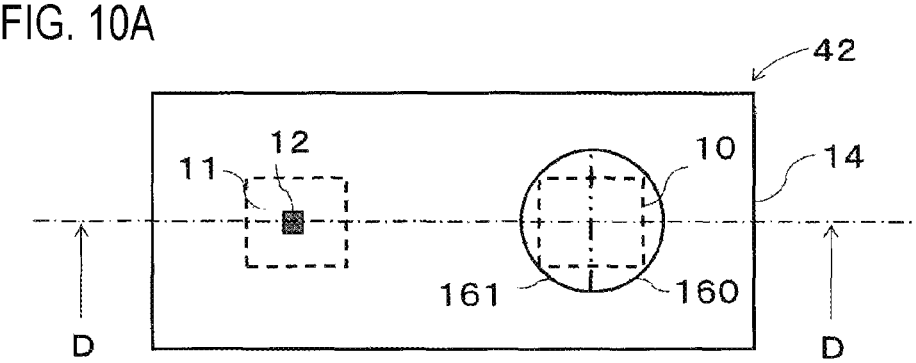
FIG. 10A is a schematic plan view illustrating the configuration of a proximity sensor according to a third embodiment of the present disclosure.
Figure 10B:
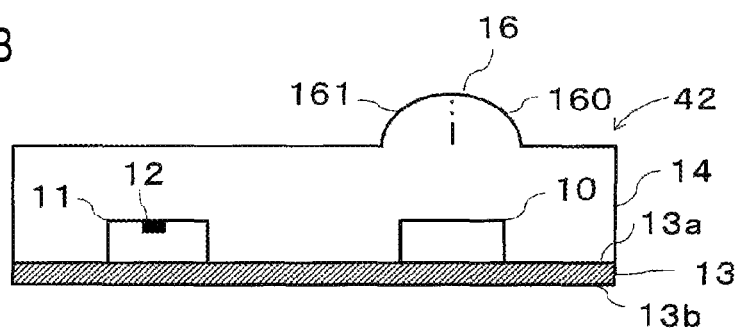
FIG. 10B is a schematic sectional view taken along line D-D in FIG. 10A.

FIG. 10A is a schematic plan view illustrating the configuration of a proximity sensor according to a third embodiment of the present disclosure. FIG. 10B is a schematic sectional view taken along line D-D in FIG. 10A. A proximity sensor according to the third embodiment is different in the following aspects from the proximity sensor of the first embodiment.

As shown in FIGS. 10A and 10B, a convex portion 16 is formed on the upper surface of the resin body 14. In the example of FIGS. 10A and 10B, the convex portion 16 has a semi-circular sectional shape. The convex portion 16 has a pair of inclined surfaces 160 and 161 inclined with respect to the main surface 13a of the support substrate 13. The inclined surfaces 160 and 161 have a spherical shape. Of the inclined surfaces 160 and 161, the inclined surface 161 is formed such that the inclined light 30 emitted from the VCSEL 10 is incident onto the inclined surface 161 and is refracted to a direction closer to the direction of the center light 31 than the incident direction of the inclined light 30. The convex portion 16 is advantageously made of the same material as the resin body 14. However, the convex portion 16 may be made of a material different from that of the resin body 14. The material of the convex portion 16 may include a light transmissive resin through which the light emitted from the VCSEL 10 transmits. The light transmissive resin may include a transparent or semi-transparent resin such as epoxy resin, polycarbonate resin, acryl resin or the like. The convex portion 16 is, for example, molded by a mold to be integrated with the resin body 14. Alternatively, the convex portion 16 may be shaped by potting.

When the convex portion 16 is integrally made of the same material as the resin body 14, the increase in the number of processes of manufacture can be suppressed.

Figure 11:
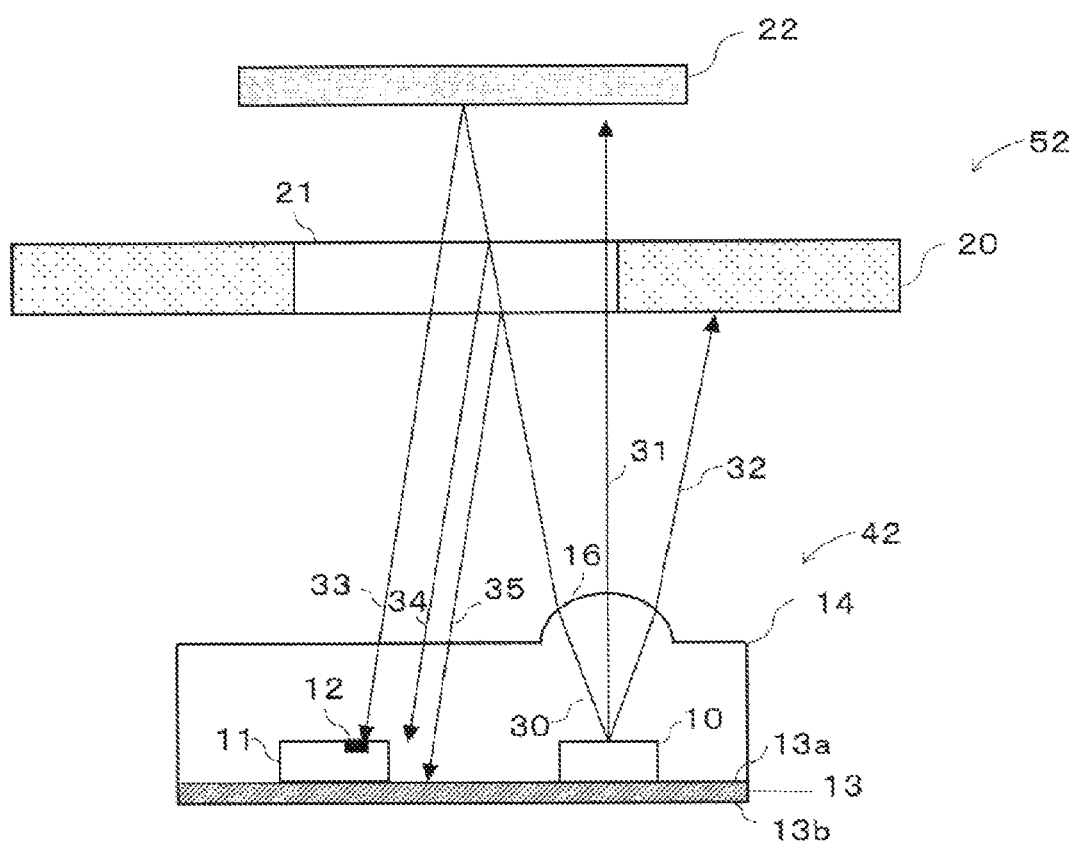
FIG. 11 is a schematic sectional view illustrating a portion of an electronic apparatus including the proximity sensor according to the third embodiment of the present disclosure.

FIG. 11 is a schematic sectional view illustrating a portion of an electronic apparatus 52 including a proximity sensor 42 according to the third embodiment of the present disclosure.

The electronic apparatus 52 includes a housing 20 and a proximity sensor 42. A window part 21 is formed in the housing 20. The electronic apparatus 52 is a cellular phone or digital camera.

The VCSEL 10 is driven to emit light at certain time intervals. Center light 31 emitted from the VCSEL 10 is emitted outside of the housing 20 through the window part 21. Inclined light 32 is reflected at the inner surface of the housing 20 in a direction away from the light receiving part 11. The inclined light 30 is refracted at the inclined surface 161 of the convex portion 16 and is emitted outside of the housing 20 through the window part 21 of the housing 20. If an object 22 is present in the vicinity of the window part 21 in the outside of the housing 20, the inclined light 30 is reflected at the object 22. Reflected light 33 from the object 22 is incident onto the light receiving element 12 of the light receiving part 11 through the window part 21 of the housing 20. The light receiving element 12 outputs an analog signal based on the intensity of the incident light. The analog signal output from the light receiving element 12 is converted into a digital value by an A/D converter. The object 22 is detected based on the digital value.

When the object 22 is moved away from the window part 21, the inclined light 30 emitted from the VCSEL 10 is refracted at the inclined surface 161 of the convex portion 16 and travels straight to the outside of the housing 20 through the window part 21 of the housing 20. Thereby, the incidence of the reflected light 33 onto the light receiving element 12 disappears and the detection state of the object 22 is released.

In the proximity sensor 42 according to the third embodiment, the inclined surface 161 of the convex portion 16 can be used to control the inclined light 30 emitted from the VCSEL 10 to travel in an appropriate direction. Thus, it is possible to easily reduce crosstalk. In addition, by forming the convex portion 16, the VCSEL 10 and the light receiving part 11 can be closer to each other. As a result, it is possible to achieve compactness and low costs of the proximity sensor 42 and the window part 21. Further, when the resin body 14 and the convex portion 16 are integrally molded by a mold, the increase in the number of processes of manufacture can be suppressed.

Figure 12:
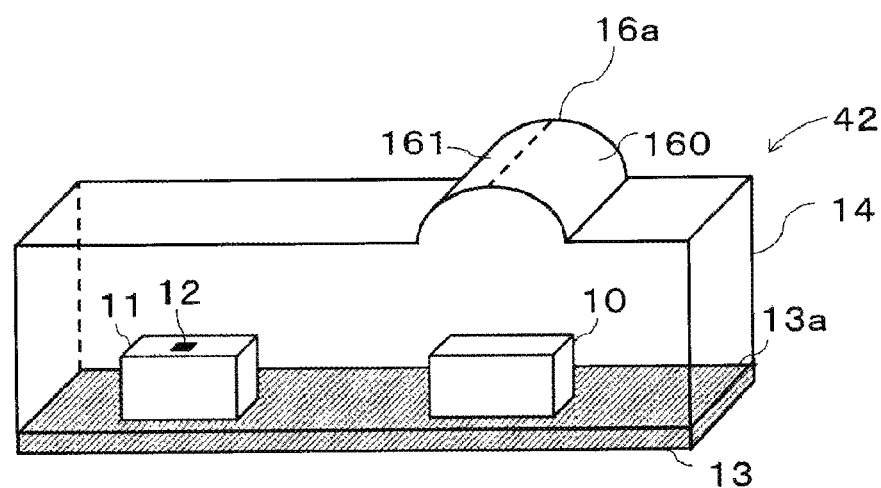
FIG. 12 is a schematic perspective view showing an example of a convex portion of the proximity sensor according to the third embodiment of the present disclosure.

FIG. 12 is a schematic perspective view showing another example of the convex portion 16 of the proximity sensor 42 of FIG. 10. In the example of FIG. 12, a convex portion 16a is formed to extend from one side of the resin body 14 to the other opposing side in a direction substantially perpendicular to the direction in which the VCSEL 10 and the light receiving part 11 are aligned. The convex portion 16a has a semi-circular sectional shape. The convex portion 16a has a pair of inclined surfaces 160 and 161 inclined with respect to the main surface 13a of the support substrate 13. Of the inclined surfaces 160 and 161, the inclined surface 161 is formed such that the inclined light 30 emitted from the VCSEL 10 is incident onto the inclined surface 161 and is refracted to a direction closer to the direction of the center light 31 than the incident direction of the inclined light 30.

Figure 13:
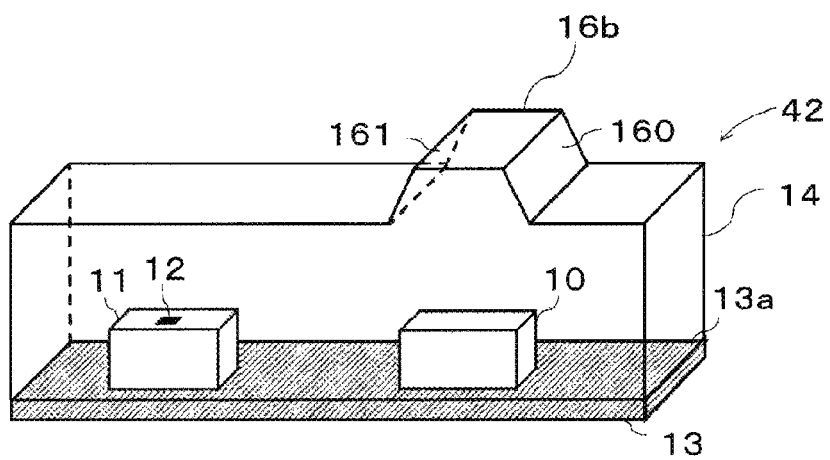
FIG. 13 is a schematic perspective view showing another example of the convex portion of the proximity sensor according to the third embodiment of the present disclosure.

FIG. 13 is a schematic perspective view showing another example of the convex portion 16 of the electronic apparatus 52 including the proximity sensor 42 of FIG. 10. In the example of FIG. 13, a convex portion 16b is formed to extend from one side of the resin body 14 to the other opposing side in a direction substantially perpendicular to the direction in which the VCSEL 10 and the light receiving part 11 are aligned. The convex portion 16b has a trapezoidal sectional shape. The convex portion 16b has a pair of inclined surfaces 160 and 161 inclined with respect to the main surface 13a of the support substrate 13. Of the inclined surfaces 160 and 161, the inclined surface 161 is formed such that the inclined light 30 emitted from the VCSEL 10 is incident onto the inclined surface 161 and is refracted to a direction closer to the direction of the center light 31 than the incident direction of the inclined light 30.

Figure 14:
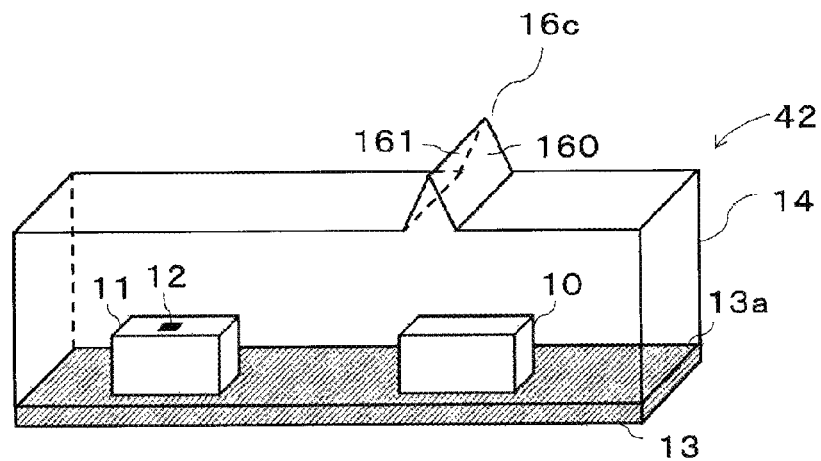
FIG. 14 is a schematic perspective view showing another example of the convex portion of the proximity sensor according to the third embodiment of the present disclosure.

FIG. 14 is a schematic perspective view showing another example of the convex portion 16 of the electronic apparatus 52 including the proximity sensor 42 of FIG. 10. In the example of FIG. 14, a convex portion 16c is formed to extend from one side of the resin body 14 to the other opposing side in a direction substantially perpendicular to the direction in which the VCSEL 10 and the light receiving part 11 are aligned. The convex portion 16c has a triangular sectional shape. The convex portion 16c has a pair of inclined surfaces 160 and 161 inclined with respect to the main surface 13a of the support substrate 13. Of the inclined surfaces 160 and 161, the inclined surface 161 is formed such that the inclined light 30 emitted from the VCSEL 10 is incident onto the inclined surface 161 and is refracted to a direction closer to the direction of the center light 31 than the incident direction of the inclined light 30.

The planar and sectional shape of the convex portion 16a, 16b or 16c shown in FIG. 12, 13 or 14 is not limited to the example of FIG. 12, 13 or 14. The convex portion 16a, 16b or 16c may have any other shapes such as a polygonal shape, an elliptical shape and the like as long as the inclined light 30 emitted from the VCSEL 10 can be refracted to a direction closer to the direction of the center light 31 than the incident direction of the inclined light 30. In addition, the convex portion 16a, 16b or 16c may not be necessarily formed to extend from one side of the resin body 14 to the other opposing side in a direction substantially perpendicular to the direction in which the VCSEL 10 and the light receiving part 11 are aligned. For example, if the inclined light 30 emitted from the VCSEL 10 can be refracted to a direction closer to the direction of the center light 31 than the incident direction of the inclined light 30, the convex portion 16a, 16b or 16c may be formed to extend in a direction substantially perpendicular to the direction in which the VCSEL 10 and the light receiving part 11 are aligned, with a certain distance from both sides of the resin body 14 to the inside thereof.

Fourth Embodiment

Figure 15:
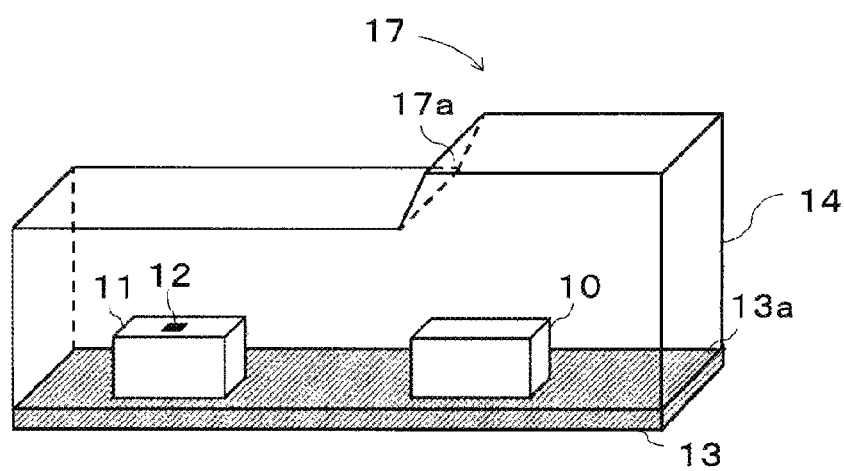
FIG. 15 is a schematic perspective view illustrating the configuration of a proximity sensor according to a fourth embodiment of the present disclosure.

FIG. 15 is a schematic perspective view illustrating the configuration of a proximity sensor according to a fourth embodiment of the present disclosure. A proximity sensor according to the fourth embodiment is different in the following aspects from the proximity sensor of the first embodiment.

As shown in FIG. 15, a stepped portion 17 is formed on the upper surface of the resin body 14. The stepped portion 17 has an inclined surface 17a inclined with respect to the main surface 13a of the support substrate 13. The inclined surface 17a is formed to extend from one side of the resin body 14 to the other opposing side in a direction substantially perpendicular to the direction in which the VCSEL 10 and the light receiving part 11 are aligned. The inclined surface 17a is formed such that the inclined light 30 emitted from the VCSEL 10 is incident onto the inclined surface 17a and is refracted to a direction closer to the direction of the center light 31 than the incident direction of the inclined light 30. The inclined surface 17a has a linear or curved shape. The stepped portion 17 is advantageously made of the same material as the resin body 14. However, the stepped portion 17 may be made of a material different from that of the resin body 14. The material of the stepped portion 17 may include a light transmissive resin through which the light emitted from the VCSEL 10 transmits. The light transmissive resin may include a transparent or semi-transparent resin such as epoxy resin, polycarbonate resin, acryl resin or the like. The stepped portion 17 is, for example, molded by a mold to be integrated with the resin body 14. Alternatively, the stepped portion 17 may be shaped by cutting or etching.

When the stepped portion 17 is integrally made of the same material as the resin body 14, the increase in the number of processes of manufacture can be suppressed.

Fifth Embodiment

Figure 16:
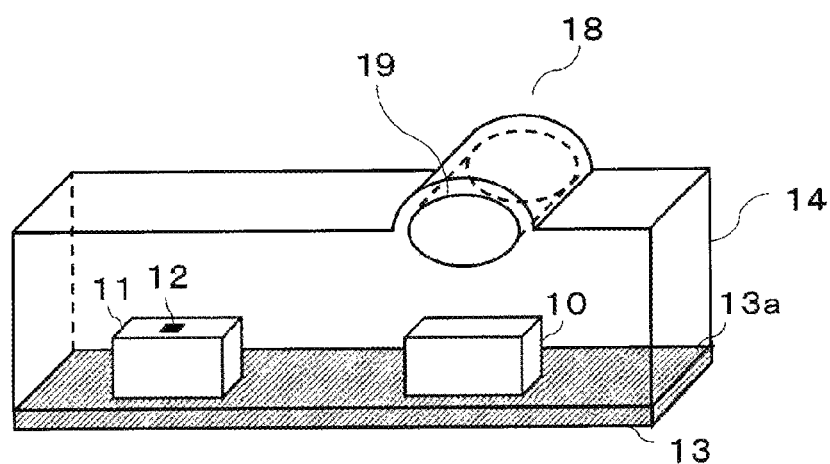
FIG. 16 is a schematic perspective view illustrating the configuration of a proximity sensor according to a fifth embodiment of the present disclosure.
Figure 17A:
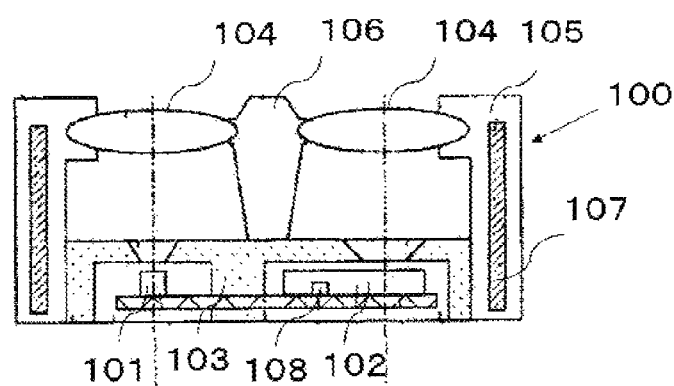
FIGS. 17A and 17B are a sectional view and a plane view of a conventional optical measuring device, respectively.
Figure 17B:
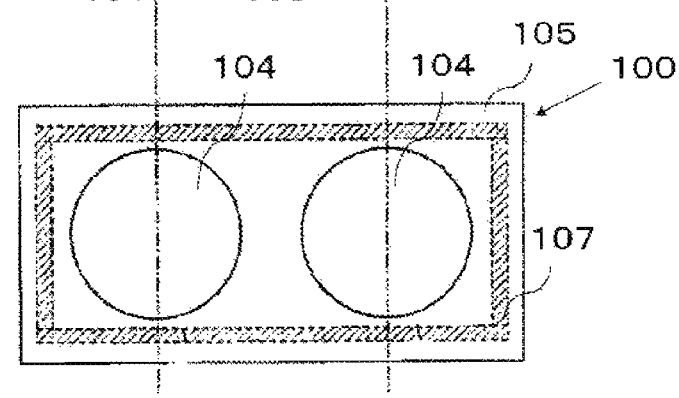

FIG. 16 is a schematic perspective view illustrating the configuration of a proximity sensor according to a fifth embodiment of the present disclosure. A proximity sensor according to the fifth embodiment is different in the following aspects from the proximity sensor of the first embodiment.

As shown in FIG. 16, a semi-cylindrical convex portion 18 is formed on the upper surface of the resin body 14 and a cylindrical notched portion 19 is formed below the convex portion 18. The convex portion 18 and the notched portion 19 are formed to extend from one side of the resin body 14 to the other opposing side in a direction substantially perpendicular to the direction in which the VCSEL 10 and the light receiving part 11 are aligned. The convex portion 18 and the notched portion 19 are formed such that the inclined light 30 emitted from the VCSEL 10 is incident onto these portions 18 and 19 and is refracted to a direction closer to the direction of the center light 31 than the incident direction of the inclined light 30. The convex portion 18 is advantageously made of the same material as the resin body 14. However, the convex portion 18 may be made of a material different from that of the resin body 14. The material of the convex portion 18 may include a light transmissive resin through which the light emitted from the VCSEL 10 transmits. The light transmissive resin may include a transparent or semi-transparent resin such as epoxy resin, polycarbonate resin, acryl resin or the like. The convex portion 18 is, for example, molded by a mold to be integrated with the resin body 14.

When the convex portion 18 is integrally made of the same material as the resin body 14, the increase in the number of processes of manufacture can be suppressed.

Other Embodiments

Although it has been illustrated in the above first to fifth embodiments that the VCSEL 10 is substantially horizontally disposed on the support substrate 13, the VCSEL 10 may be obliquely disposed on the support substrate 13. In this case, reflected light of the center light 31 emitted from the VCSEL 10 can be incident onto the light receiving element 12. Thereby, it is possible to increase the intensity of received light.

Although it has been illustrated in the above first to fifth embodiments that the light receiving part 11 is horizontally disposed on the support substrate 13, the light receiving part 11 may be obliquely disposed on the support substrate 13. In this case, reflected light can be substantially vertically incident onto a light receiving surface of the light receiving element 12. Thereby, it is possible to increase the intensity of received light.

INDUSTRIAL APPLICABILITY

The present disclosure can be used to detect the presence of an object. In addition, the present disclosure can be effectively used in a variety of electronic apparatuses including a proximity sensor. Therefore, the present disclosure has high industrial applicability.

According to the present disclosure in some embodiments, it is possible to provide a proximity sensor with a simple structure, which is capable of reducing crosstalk and being decreased in size.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An electronic apparatus comprising:
a housing including a window part; and
a proximity sensor accommodated in the housing,
wherein the proximity sensor includes:
  a support substrate;
  a surface emission laser;
  a light receiving part; and
  a resin body including an outer surface on which a notched portion is present,
wherein the support substrate has a main surface, on which the surface emission laser and the light receiving part are disposed, and a rear surface,
wherein the surface emission laser overlaps with the window part,
wherein the light receiving part partially overlaps with the window part,
wherein the surface emission laser is disposed on the main surface so as to emit light in a direction away from the rear surface of the support substrate,
wherein the resin body is made of a light transmissive resin through which the light emitted from the surface emission laser transmits, and is disposed on the main surface of the support substrate so as to integrally cover the surface emission laser and the light receiving part, and a portion of the resin body between the surface emission laser and the light receiving part is formed of the same light transmissive resin as the other portions,
wherein the light emitted from the surface emission laser has a certain spread angle, and includes center light of a first direction and inclined light of a second direction which is inclined from the first direction to the light receiving part,
wherein the notched portion is configured to refract the second direction of the inclined light to a direction closer to the first direction than the second direction, and
wherein the light receiving part is disposed at a position at which the light emitted from the surface emission laser is reflected at an object and reflected light from the object is incident onto the light receiving part.

2. The electronic apparatus of claim 1, wherein the notched portion includes an inclined surface which is formed so as to refract the second direction of the inclined light to the direction closer to the first direction than the second direction, and
wherein the light receiving part is disposed at a position at which the direction of the inclined light refracted by the inclined surface is reflected at the object and the reflected light from the object is incident onto the light receiving part.

3. The electronic apparatus of claim 1, wherein the notched portion has an inverted triangular sectional shape, an inverted trapezoidal sectional shape or an arc sectional shape.

4. The electronic apparatus of claim 1, wherein the surface emission laser is a vertical cavity surface emitting laser.

5. The electronic apparatus of claim 1, wherein the surface emission laser is a vertical external cavity surface emitting laser.

6. The electronic apparatus of claim 1, wherein the electronic apparatus is a cellular phone.

7. The electronic apparatus of claim 1, wherein the electronic apparatus is a digital camera.

8. The electronic apparatus of claim 1, wherein a position on the outer surface of the resin body, at which the notched portion is present, is separated from a center of the surface emission laser in a plan view.

9. An electronic apparatus comprising:
a housing including a window part; and
a proximity sensor accommodated in the housing,
wherein the proximity sensor includes:
a support substrate having a main surface and a rear surface;
a surface emission laser disposed on the main surface so as to emit light in a direction away from the support substrate;
a light receiving part disposed on the main surface to receive reflected light which is emitted from the surface emission laser and then reflected from an object; and
a resin body that is made of a light transmissive resin through which the light emitted from the surface emission laser transmits, and includes an outer surface on which a convex portion is present,
wherein the surface emission laser partially overlaps with the window part,
wherein the light receiving part partially overlaps with the window part,
wherein the resin body is disposed on the main surface of the support substrate so as to integrally cover the surface emission laser and the light receiving part, and a portion of the resin body between the surface emission laser and the light receiving part is formed of the same light transmissive resin as the other portions,
wherein the light emitted from the surface emission laser has a certain spread angle, and includes center light of a first direction and inclined light of a second direction which is inclined from the first direction to the light receiving part,
wherein the convex portion is configured to refract the second direction of the inclined light to a direction closer to the first direction than the second direction, and
wherein a cylindrical notched portion is present below the convex portion.

10. The electronic apparatus of claim 9, wherein the convex portion includes an inclined surface which is formed so as to refract the second direction of the inclined light to the direction closer to the first direction than the second direction, and
wherein the light receiving part is disposed at a position at which the direction of the inclined light refracted by the inclined surface is reflected at the object and the reflected light from the object is incident onto the light receiving part.

11. The electronic apparatus of claim 9, wherein the convex portion has a triangular sectional shape, a trapezoidal sectional shape or an arc sectional shape.

12. An electronic apparatus comprising:
a housing including a window part; and
a proximity sensor accommodated in the housing,
wherein the proximity sensor includes:
a support substrate;
a surface emission laser;
a light receiving part; and
a resin body including an outer surface on which a stepped portion is present,
wherein the support substrate has a main surface, on which the surface emission laser and the light receiving part are disposed, and a rear surface,
wherein the surface emission laser overlaps with the window part,
wherein the light receiving part partially overlaps with the window part,
wherein the surface emission laser is disposed on the main surface so as to emit light in a direction away from the rear surface of the support substrate,
wherein the resin body is made of a light transmissive resin through which the light emitted from the surface emission laser transmits, and is disposed on the main surface of the support substrate so as to integrally cover the surface emission laser and the light receiving part, and a portion of the resin body between the surface emission laser and the light receiving part is formed of the same light transmissive resin as the other portions,
wherein the light emitted from the surface emission laser has a certain spread angle and includes center light of a first direction and inclined light of a second direction which is inclined from the first direction to the light receiving part,
wherein the stepped portion is configured to refract the second direction of the inclined light to a direction closer to the first direction than the second direction, and
wherein the light receiving part is disposed at a position at which the light emitted from the surface emission laser is reflected at an object and reflected light from the object is incident onto the light receiving part.

13. The electronic apparatus of claim 12, wherein the stepped portion includes an inclined surface which is formed so as to refract the second direction of the inclined light to the direction closer to the first direction than the second direction, and
wherein the light receiving part is disposed at a position at which the direction of the inclined light refracted by the inclined surface is reflected at the object and the reflected light from the object is incident onto the light receiving part.

14. The electronic apparatus of claim 13, wherein the stepped portion is on the outer surface of the resin body so that the inclined surface of the stepped portion does not overlap with a center of the surface emission laser in a plan view.

* * * * *